US012696993B2

(12) United States Patent
Gupta

(10) Patent No.: US 12,696,993 B2
(45) Date of Patent: Aug. 4, 2026

(54) OVERFLOW PREVENTION CONTAINER

(71) Applicant: Vishal Gupta, Portage, MI (US)

(72) Inventor: Vishal Gupta, Portage, MI (US)

( * ) Notice: Subject to any disclaimer, the term of this patent is extended or adjusted under 35 U.S.C. 154(b) by 0 days.

(21) Appl. No.: 18/892,954

(22) Filed: Sep. 23, 2024

(65) Prior Publication Data

US 2026/0083269 A1     Mar. 26, 2026

(51) Int. Cl.
*A47J 27/56*     (2006.01)
*A47J 45/08*     (2006.01)

(52) U.S. Cl.
CPC .............. *A47J 27/56* (2013.01); *A47J 45/08* (2013.01)

(58) Field of Classification Search
CPC ............. A47J 27/56; A47J 45/08; A47J 37/10
USPC ....................................................... 220/573.1
See application file for complete search history.

(56) References Cited

U.S. PATENT DOCUMENTS

| | | | | | |
|---|---|---|---|---|---|
| 181,823 | A | * | 9/1876 | Cornwall ................ | A47J 37/10 |
| | | | | | 99/425 |
| 933,545 | A | * | 9/1909 | French .................... | A47J 37/10 |
| | | | | | 99/424 |
| 1,076,167 | A | * | 10/1913 | Smith ...................... | A47J 37/10 |
| | | | | | 220/573.1 |
| 1,089,664 | A | * | 3/1914 | Osada ..................... | A47J 37/10 |
| | | | | | 126/390.1 |
| 1,308,151 | A | * | 7/1919 | Vogel ...................... | A47J 37/10 |
| | | | | | 99/422 |

| | | | | | |
|---|---|---|---|---|---|
| 1,432,950 | A | * | 10/1922 | Bell ......................... | A47J 37/10 |
| | | | | | 126/390.1 |
| 1,502,843 | A | * | 7/1924 | Berger .................... | A47J 37/10 |
| | | | | | 126/390.1 |
| 1,522,329 | A | * | 1/1925 | Salucci ................... | A47J 37/10 |
| | | | | | 99/422 |
| 2,151,535 | A | * | 3/1939 | Scurlock ................. | A47J 37/10 |
| | | | | | 126/390.1 |
| 2,170,880 | A | * | 8/1939 | Wagner ................... | A47J 37/10 |
| | | | | | 126/390.1 |
| 2,248,216 | A | * | 7/1941 | Bukoski .................. | A47J 37/10 |
| | | | | | 126/299 C |
| 2,262,302 | A | * | 11/1941 | Sinclair ................... | A47J 37/10 |
| | | | | | 99/425 |
| 2,328,978 | A | * | 9/1943 | Hennessy ............. | A47J 37/067 |
| | | | | | 99/425 |
| 2,534,407 | A | * | 12/1950 | Bramberry, Jr. ........ | A47J 37/10 |
| | | | | | 99/425 |
| 2,554,412 | A | * | 5/1951 | Kavanagh ............... | A47J 37/10 |
| | | | | | 99/425 |
| 2,581,161 | A | * | 1/1952 | Anderson ............... | A47J 37/10 |
| | | | | | 126/390.1 |

(Continued)

*Primary Examiner* — Ernesto A Grano
(74) *Attorney, Agent, or Firm* — Rosenberg, Klein & Lee

(57)     ABSTRACT

An overflow prevention container or a boiling container has a bottom member configured with an underside connector plate having a first portion in contact with and a second portion of various contours extending in a thermal separation from the external surface of the bottom member. A thermal gradient is created between first and second portions, thus forming thermally distinct sides of the cooking vessel, causing liquid in the vessel cavity to circulate with a horizontal convectional flow pattern, resulting in prevention of the liquid medium from spillage from the vessel cavity. Grooves on an internal surface of the bottom member terminate in a jump board to provide directional constraint to the liquid as it is being heated.

21 Claims, 17 Drawing Sheets

10

(56)                References Cited

U.S. PATENT DOCUMENTS

| | | | | | |
|---|---|---|---|---|---|
| 2,878,803 | A | * | 3/1959 | Del Papa | A47J 37/10 |
| | | | | | 126/42 |
| 3,110,303 | A | * | 11/1963 | Brownrigg | A47J 27/56 |
| | | | | | 220/912 |
| 3,381,851 | A | * | 5/1968 | Koneval | A47J 36/022 |
| | | | | | D7/688 |
| 4,446,776 | A | * | 5/1984 | Gelfman | A47J 37/10 |
| | | | | | D7/367 |
| D380,934 | S | * | 7/1997 | Alarid, Jr. | D7/354 |
| D381,555 | S | * | 7/1997 | Baker | D7/354 |
| 5,893,320 | A | * | 4/1999 | Demaree | A47J 43/18 |
| | | | | | 219/732 |
| D414,981 | S | * | 10/1999 | Roskind | D7/359 |
| 6,092,520 | A | * | 7/2000 | Hasegawa | A47J 27/022 |
| | | | | | 220/573.1 |
| D669,730 | S | * | 10/2012 | Mandil | D7/354 |
| 8,353,243 | B2 | * | 1/2013 | Lee | A47J 37/10 |
| | | | | | 220/573.1 |
| D676,705 | S | * | 2/2013 | Di Bartolo | D7/354 |
| 8,381,640 | B1 | * | 2/2013 | Wilson | A47J 27/002 |
| | | | | | 99/413 |
| 8,590,728 | B1 | * | 11/2013 | McPherson | A47J 27/56 |
| | | | | | 220/573.1 |
| D798,651 | S | * | 10/2017 | Yu | D7/354 |
| 10,517,430 | B1 | * | 12/2019 | Trzcinski | A47J 45/071 |
| 11,974,697 | B2 | * | 5/2024 | Boatright | A47J 37/108 |
| 2006/0011072 | A1 | * | 1/2006 | Giornali | A47J 37/10 |
| | | | | | 99/422 |
| 2007/0095215 | A1 | * | 5/2007 | Ho | A47J 45/068 |
| | | | | | 99/342 |

| | | | | | |
|---|---|---|---|---|---|
| 2009/0202693 | A1 | * | 8/2009 | Cheng | A47J 27/04 |
| | | | | | 220/573.1 |
| 2009/0230116 | A1 | * | 9/2009 | Hsu | A47J 27/002 |
| | | | | | 220/573.1 |
| 2009/0277338 | A1 | * | 11/2009 | Palmer | A47J 36/00 |
| | | | | | 220/573.1 |
| 2009/0321459 | A1 | * | 12/2009 | Maczko | A47J 36/064 |
| | | | | | 220/731 |
| 2010/0084412 | A1 | * | 4/2010 | Huang | A47J 27/022 |
| | | | | | 220/573.1 |
| 2011/0041708 | A1 | * | 2/2011 | Groll | A47J 27/002 |
| | | | | | 164/112 |
| 2012/0055346 | A1 | * | 3/2012 | Navare | A47J 37/10 |
| | | | | | 99/446 |
| 2013/0108761 | A1 | * | 5/2013 | Kenton | A47J 37/10 |
| | | | | | 426/523 |
| 2014/0131361 | A1 | * | 5/2014 | Schroeder | A47J 37/10 |
| | | | | | 220/573.1 |
| 2015/0136791 | A1 | * | 5/2015 | Povey | A47J 27/002 |
| | | | | | 220/573.1 |
| 2015/0313405 | A1 | * | 11/2015 | Groll | A47J 37/10 |
| | | | | | 220/573.1 |
| 2016/0287015 | A1 | * | 10/2016 | Kim | A47J 37/06 |
| 2019/0282028 | A1 | * | 9/2019 | Kim | A47J 37/10 |
| 2020/0037807 | A1 | * | 2/2020 | Yamada | A47J 27/58 |
| 2022/0142391 | A1 | * | 5/2022 | Scheerer | A47J 27/026 |
| 2023/0020984 | A1 | * | 1/2023 | Kim | A47J 37/10 |
| 2023/0248180 | A1 | * | 8/2023 | Hsieh | A47J 36/02 |
| | | | | | 220/573.2 |
| 2023/0270283 | A1 | * | 8/2023 | Wang | A47J 27/002 |
| | | | | | 220/573.2 |
| 2024/0000267 | A1 | * | 1/2024 | Boatright | A47J 37/108 |
| 2025/0040759 | A1 | * | 2/2025 | Thaxton | A47J 37/106 |

* cited by examiner

10

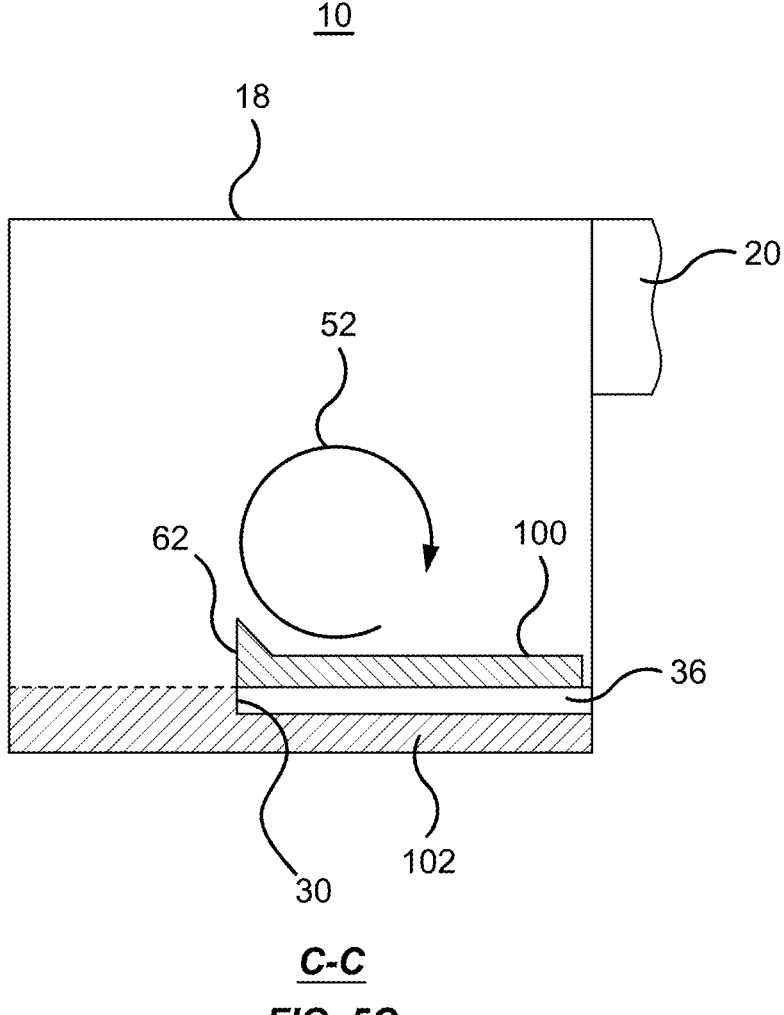
_C-C_
_FIG. 5C_

10

C-C

<u>10</u>

OVERFLOW PREVENTION CONTAINER

FIELD OF THE INVENTION

This invention is directed to the field of heating liquids within a boiling container such as a cooking vessel.

This invention is directed to the field of minimizing overflow of boiling liquid from a boiling container being heated by an external heat source.

This invention relates to the field of minimizing turbulent effects throughout the volume of a liquid during a heating process acting on a liquid containing vessel when the liquid has reached the boiling point temperature of the liquid.

This invention relates to the field of heating liquids within a container to a boiling point of the liquid within the container while controlling agitation of the liquid within the container.

This invention is directed to a system of controlled and predetermined directional flow of a boiling liquid within a container being heated.

This invention relates to a heating system where a contained liquid within a boiling container provides for transport of the heated liquid from a first temperature zone of lower temperature to at least a second temperature zone of higher temperature within the container in a circulatory manner.

This invention is directed to a heating system which directs heated liquid from a first lower temperature heating zone in a liquid containing vessel to a second higher temperature heating zone which results in a circular convection flow of the liquid within the boiling container between the first and second heating zones.

This invention relates to a heating system which provides convection currents established by the container construct which provides for convectional heat flow in a controlled directional flow path to prevent liquid spill from interior of the container to the external environment.

The present invention addresses an overflow prevention container, and in particular, the present invention is directed to a cooking vessel which is crafted with distinct cooler and hotter sides for promoting a substantially horizontal convectional flow of liquid medium within the vessel cavity from the cooler side towards the hotter side, thus preventing the liquid medium from spillage from the vessel cavity.

The present container heating system additionally is addressed to a boiling or cooking vessel which incorporates an innovative underside connector plate fabricated in various configurations, where the underside connector plate renders thermal insulation from a heat source through a portion of the bottom surface area of the container to create a first zone of lower liquid temperature within the cooking vessel which is transported to a second zone of higher temperature of the liquid within the container which is heated in a second portion of the bottom surface area of the cooking or heating or boiling container where heat from the external heat source develops a hotter bottom surface temperature applied to the liquid in the second portion or second heating zone of the bottom surface of the heating container when taken with respect to a first heating zone to forming a thermal gradient promoting a horizontal convectional flow of the liquid medium within the vessel cavity containing the liquid reaching the boiling point temperature of the liquid.

The present invention is also directed to a boiling container having a construct configured with a grooved inner surface of the bottom of the vessel which enhances and controls the parallel directional flow of a liquid medium along the grooves to lessen turbulence of the convection flowing liquid thus promoting an efficient boiling process.

The present invention also addresses an overflow prevention container or spill-proof container configured with the grooves on the inner surface of the bottom of the vessel where the grooves on a cooler side of the vessel terminate in a jump board or inclined surface disposed in tilting relationship with the inner surface of the vessel's bottom to provide the liquid medium with a lift to further facilitate convection for the flow of the liquid within the container.

The present invention is also directed to the boiling container, where the grooves on either side of the jump board, (i.e., the hot portion or the cold portion of the cooking vessel), augment the vessel's surface area to permit the liquid within the boiling container to heat or cool more rapidly.

The present invention is further directed to a container having a lower temperature or cooler side and a higher temperature or hotter side, where the cooler side of the container comprises heat radiant for dissipating the heat from the side of the vessel adjacent a vessel handle to avoid user discomfort when manually contacting the hand of a user when handling the heating vessel during or subsequent to the heating process.

The present invention also addresses the construct of the heating container to include a handle which includes a low conductivity insulation element such as a rubber covering which may be formed of a rubber like composition which has a low thermal conductivity for reducing heat transport effects to a user grasping the handle.

In addition, the present invention addresses a boiling container which includes an arcuate edge element attached to or formed on a rim of the boiling container where the arcuate edge element is directionally curved toward the inner volume of the heating vessel in a manner such that the rising boiling liquid is directed internal to the heating vessel cavity to aid with flow convection to further facilitate avoidance of the spillage of the liquid medium from the heating vessel.

The subject overflow prevention container is directed to boiling container which includes an arcuate edge element attached to the rim of the overflow prevention container for directing heated boiling liquid into the container where the arcuate edge element extends throughout a portion of the circumference of the boiling container rim or extends throughout the circumference of the rim of the boiling container.

The subject overflow prevention container relates to a boiling container which has an arcuate edge element attached to a rim of the boiling container in one piece formation with the boiling container rim or as a separate element which is detachable from the rim of the boiling container.

BACKGROUND OF THE INVENTION

The subject invention is directed to a boiling container or vessel containing a liquid which is being heated to the boiling point of a liquid contained therein. In particular the heating vessel of the subject concept is directed to an "open heating system" where the heating vessel is exposed to the atmosphere (external environment) generally having a pressure of one atmosphere.

By general definition "boiling" is the process by which a liquid phase is transformed into a liquid vapor or gaseous phase when the liquid is heated to the liquid's boiling point. The transformation from the liquid phase to the gaseous phase begins when the liquid vapor pressure attains equality with the atmospheric pressure (external environment). In a liquid such as water (boiling point of 100 Degrees Centigrade at 1 atmosphere), as the molecules of water are continually heated the molecules which are closely packed begin to displaced from each other by a sufficient amount to transform from the liquid phase to the gaseous phase and visually detected bubbles form.

When the boiling point temperature is reached (and thereafter as heat is continually applied to a containment vessel) the molecules are energized and the bubbles will rise to a top surface of the contained liquid. The gaseous molecules which are emitted into the external environment remove thermal energy from the contained liquid within the containment vessel and the temperature of the contained liquid remains substantially constant during the boiling process.

Commercially purchased heating or cooking vessels are available as cookware or bakeware which are designed for cooking, baking, roasting, boiling, or steaming. Such commercially available vessels are generally fabricated from composition such as steel, cast iron, aluminum, clay, and various other types of ceramics. In general, such compositions selected for heating vessels have a relatively high thermal conductivity to permit efficient heat transport from the heating source to the liquid within the containment vessel.

When liquid or other contents of the heating, containment or cooking vessel are heated, it is desirable that the contents of the container do not overflow from the containment vessel and spill out of the vessel.

PRIOR ART

There have been numerous prior art approaches in the field of fabricating heating or cooking vessels to try and prevent liquid (and food or other composition) from overflowing the containment or boiling vessel when and subsequent the boiling point having been reached.

In one prior art approach as depicted in PCT publication, WO2020085589 ('589) there is described a cooking vessel with the intent of trying to improve the heat transfer effect to food being cooked. In the '589 reference, when the food boils, the flow of the food is hindered by protrusions formed on the inner surface of the wall of the heating or containment vessel which has the object of trying to prevent the boiling liquid from overflowing the containment vessel. The cooking vessel described in the '589 prior art has a bottom base and side walls integrally formed with the bottom base The protrusions formed on the cooking vessel side walls have a recessed outer surface and a protruding inner surface so that the area of contact with flames of a gas stove and the area of contact with the ingredients within the cooking vessel are increased, thus increasing the heat transfer effect to the ingredients. The protrusion portions are inclined such that foreign matter that floats when the ingredients are boiled is guided to flow inward from the outside, thus making the removal of the floating matter convenient. In addition, when the ingredients are boiled, the protrusions protrude in an inclined manner on the inner surface of the vessel to try and prevent the vessel from boiling over and prevent the ingredients from sticking to the inner surface of the vessel. This prior art design, although alluding to improvement in preventing overflow is not sufficient for prevention of overflowing of boiling liquid from the cooking vessel.

Another improved cooking pot for spill-over-proof described in Chinese patent publication CN201094531

('531) is directed to the concept of preventing food from spilling out of the pot during cooking. The cooking pot of ('531) is configured with a bottom plate having fan-shaped grooves. A composite layer device is arranged in a round container pot which is composed of a round bottom plate with a globoid sector notch groove and a groove hoisting ring. The round bottom plate and a groove hoisting ring are connected. The composite layer device is arranged on the pot body through the groove hoisting ring and is equipped with a pot cover. Small bubbles caused by the heating of the pot bottom are temporarily stopped in the globoid sector notch groove on the bottom of the round bottom plate. During heating small bubbles collide and conjugate to compose larger bubbles which have a stronger extensive force to overcome the binding force of foods for maintaining the existence of the bubbles. Supposedly, in the '531 the bubbles are pierced or blasted to avoid a large number of bubbles in the pot body and achieve an anti-spilling effect. Since the bubbles in the pot do not remain for an extended time this supposedly achieves the effect of preventing overflow from the cooking pot. Although possibly aiding in prevention of overflow, the '531 reference does not provide fabrication of the cooking pot to provide a convection flow of liquid to attain a fully contained liquid without unwanted overflow from the cooking pot.

Another drip-proof boiling vessel is described in CN 113440013 ('013) which discloses an apparatus configured for prevention of overflow of food during heating. The cooker is in the form of a pot which is composed of a bottom plate with fan-shaped grooves. The drip-proof structure comprises a body and a hydrophilic rough layer arranged on the bottom surface of the body. The hydrophilic rough layer has a concave-convex structure. A sand texture surface is formed on the bottom surface of the drip-proof structure. The sand texture surface increases the contact area between the bottom surface of the drip-proof structure and water droplets, therefore the hydrophilicity of the drip-proof structure is enhanced, condensate water is defused on the bottom surface of the drip-proof structure to form a liquid film, water drops are prevented from being formed and dropped back into the food.

Still another cooking assembly for improved preparation of food is presented in U.S. Patent Application Publication No. 2012/0258224. The cooking assembly includes a base pan having an interior surface. An inner pan is suspended above the base pan. A grill may be disposed above the inner pan which allows for a variety of food items to be displaced on top of the grill and cooking evenly.

None of these references, although possibly attaining certain improvements for food preparation, are deficient in many aspects which would provide an efficient prevention from spillage of the food from the cooking vessel.

Although numerous attempts have been made to attain an efficient overflow prevention cooking vessel, none of the prior art cooking vessels use a concept of the vessel crafted with distinct cooler (lower temperature) and hotter (higher temperature) sides or zones to promote a convectional flow of liquid for displacement of the liquid from the lower temperature cooler side containment vessel to a higher temperature or hotter side of the containment vessel in a convection flow of the heated liquid in the containment vessel. None of the prior art provides for fabrication of the containment vessel having an innovative underside connector plate available in various configurations, which form: (1) a thermally insulating gap defined between the underside connector plate and a portion of the bottom of the vessel, (2) a unique grooved surface on the inside of the bottom of the vessel for improvement of the boiling process with the grooves raised above the bottom surface of the boiling container, (3) a jump board to give the liquid a lift to further facilitate convection flow currents and to allow selected directional flow of the liquid, (4) a jump board having grooves on either side of the jump board to augment the vessel's surface area to allow the liquid to heat or cool more rapidly, (5) a cooler side of the vessel formed with a heat radiant members for dissipating the heat from the side of the vessel adjacent the metal handle, (6) a rubber insulation handle, or (7) an inwardly curved side wall edge member on the higher temperature or second zone of overflow prevention container attached in one-piece formation or as a detachable element to a rim of the boiling container which directs the liquid inward the vessel cavity and aids in protection from the spillage.

SUMMARY OF THE INVENTION

It is therefore an objective of the present invention to provide a container which is configured for efficient spill-proofing which is free of the spillage of the content (food or liquid) from the vessel during boiling or cooking.

It is another objective of the present invention to provide a container with an enhanced substantially horizontal convectional flow which is crafted with distinct cooler side (first lower temperature zone) and hotter side (second higher temperature zone) to promote a convectional flow of liquid for transport from the cooler to the hotter side, thus creating an improved horizontal vortex within the vessel.

It is a further objective of the present invention to provide a cooking vessel designed with the underside connector plate which is available in various configurations, and which provides thermal insulation at a portion of the bottom of the cooking vessel in order to form the hot and cool surfaces on the boiling side of the bottom of the container.

It is still an objective of the present invention to provide a container with a grooved inner surface of the bottom of the vessel, where the grooved surface that is raised plays a pivotal role in the boiling process, wherein the raised inner surface of the grooves allows directional flow for the liquid, and where the grooves on the cooler side may terminate in a jump board to further improve the convectional displacement of the liquid, where the grooves on either side of the jump board, hot side or cold side, augment the surface area to allow the liquid to heat or cool more rapidly.

It is another object of the present invention to provide an overflow prevention container where the cooler side of the vessel or container includes one or more heat radiant members for dissipating the heat from the side of the vessel adjacent the handle which may be provided with a rubber insulation.

It is an additional objective of the present invention to provide a container with a side wall formed with the inwardly curved top edge member which is located on the rim of the boiling container and extends at least partially throughout the circumference of the hot side of the container so that the rising boiling liquid is directed inward of the vessel to aid in developing the convection flow of the liquid being heated by the external heating source.

The subject spill-proof cooking vessel includes a bottom member which has an internal surface, an external surface, and a peripheral joint outlining the internal and external surfaces. The external surface of the bottom member has a first portion and a second portion bordering with one another. An underside connector plate is provided at the bottom member. The underside connector plate has a first area integrally secured to the first portion of the external surface of the bottom member and a second area positioned in vertical alignment with the second portion of the external surface of the bottom member. The second area of the underside connector plate extends horizontally in a spaced apart relationship with and in a spaced apart separation from the second portion of the external surface of the bottom member.

The contour of the second portion of the external surface of the bottom member is selected from a group including a straight, semi-circle, crescent, concave-convex contours, angled, and a combination thereof.

The container further includes a side wall having an inner surface and an outer surface. The side wall extends vertically from the peripheral joint of the bottom member in an integral connection therewith. A vessel cavity is defined by the internal surface of the bottom member and inner surface of the side wall.

Upon bringing the underside connector plate in a thermal contact with a heat source, a thermal gradient is created between the first and second portions of the external surface of the bottom member, thus forming distinct first and second sides of the container, with the first side in correspondence to the first portion and with the second side in correspondence to the second portion of the external surface of the bottom member, respectively. The first side of the container has a temperature exceeding the temperature of the second side of the container.

A liquid medium received in the vessel cavity is exposed to the thermal gradient and is subsequently displaced from the second side towards the first side of the container. This displacement of the liquid medium creates a substantially horizontal convectional flow within the vessel cavity, which is favorable for prevention of the liquid medium from spillage from the vessel cavity.

The underside connector plate and the second portion of the external surface of the bottom member define a thermally isolating gap sandwiched therebetween. The thermally isolating gap functions to reduce transmittance of heat to the second portion of the external surface of the bottom member by a heat source disposed in thermal contact with the underside connector plate. The thermally isolating gap may be filled with air, or optionally, the thermally isolating gap may be filled with a material having a thermal conductivity lower than a thermal conductivity of the metal material of the cooking vessel.

An array of grooves is preferably fabricated on the internal surface of the bottom member. The grooves extend substantially in parallel to one another between respective portions of the peripheral edge of the bottom member with a plurality of inter-groove channels formed between adjacent grooves to provide a directional flow of a liquid medium within the vessel cavity along the inter-groove channels.

Each groove of the array of grooves has groove walls extending above the internal surface of the bottom member. Each inter-groove channel is defined between the groove walls of the adjacent grooves.

Preferably, the grooves are configured as a first array of substantially parallel grooves extending on the internal surface of the bottom member above the first portion and a second array of substantially parallel grooves extending on the internal surface of the bottom member above the second portion of the external surface of the bottom member. A jump board is provided which extends on the internal surface of the bottom member in a tilted relationship therewith across and between the first and second arrays of the substantially parallel grooves. The jump board lifts the flow of the liquid medium within the vessel cavity moving along the inter-groove channels on the inner surface of the bottom member in a direction from the second portion towards the first portion of the external surface of the bottom member. The first and second arrays of grooves provide an efficient thermal transformation for the flow of the liquid medium moving along the inter-groove channels.

Preferably, a heat radiant member is disposed at the outer surface of the side wall at a location proximal to the second portion of the external surface of the bottom member. The heat radiant member includes a plurality of fins extending away from the outer surface of the side wall to dissipate heat therefrom.

The second portion of said external surface of said bottom member is defined by a respective portion of said peripheral joint and an arcuated bordering line extending between said first and second portions of said external surface of said bottom member.

For enhancing the prevention from the liquid spillage from the vessel, preferably, a detachable, complete or partial ring of the upper edge of the side wall is curved inward of the vessel cavity to direct a flow of liquid medium inward of the vessel cavity.

These and other objects and advantages of the subject system addressed in the present disclosure will be apparent in view of the Drawings and Description of the Preferred Embodiments presented herein.

BRIEF DESCRIPTION OF THE DRAWINGS

FIG. 5C is a schematic cross-section of the subject boiling container taken along cross-sectional lines C-C of FIG. 5B;

DESCRIPTION OF THE PREFERRED EMBODIMENTS

Figure 1:
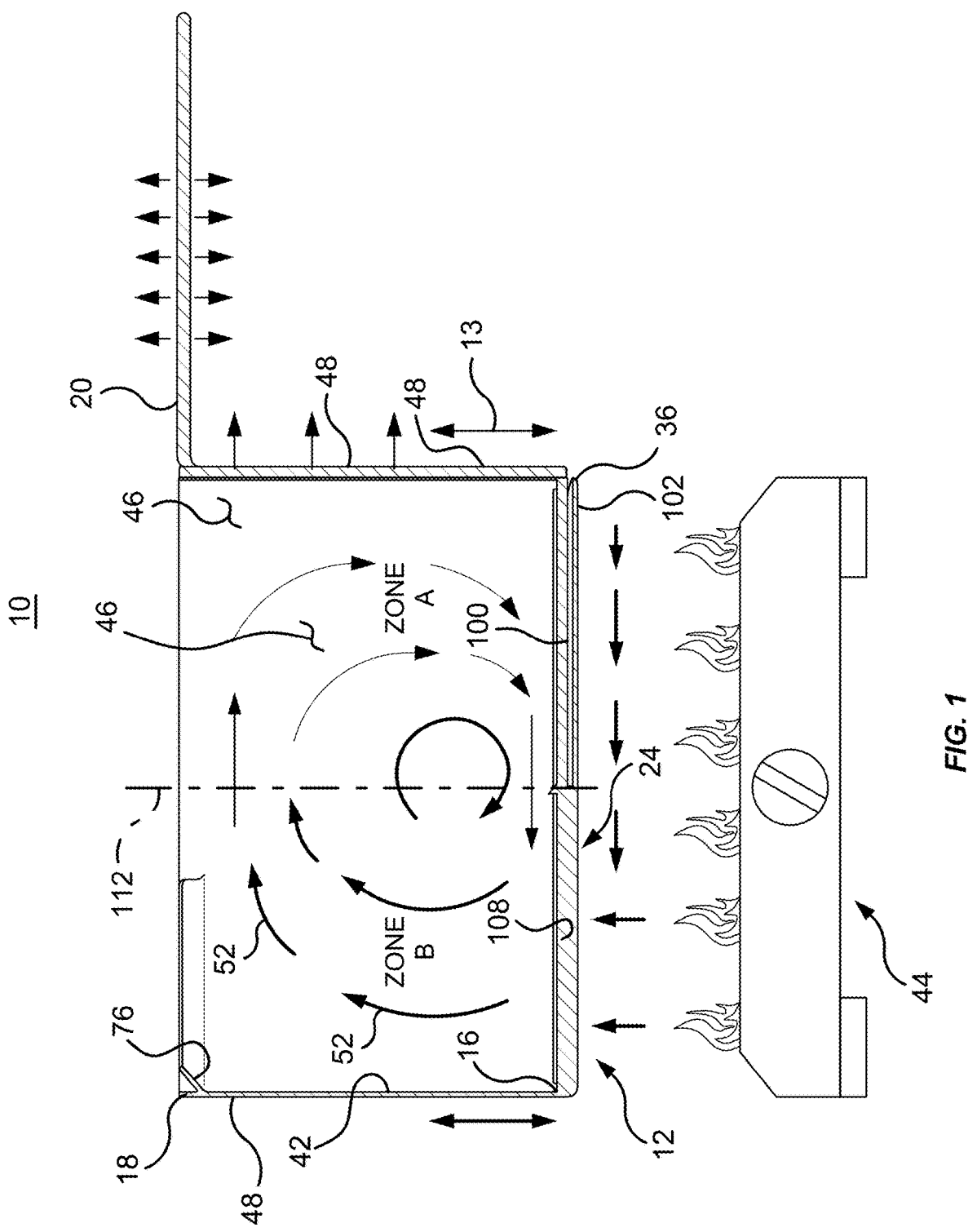
FIG. 1 is a schematic view of the present boiling container positioned on an external source of heat.

Referring to FIGS. 1, 2A-2D, 3, 4, 5A-5E, 6A-6F, and 7A-7D, the subject overflow prevention container vessel 10 (also referred to herein intermittently as a boiling container or cooking vessel), includes a bottom section (also referred to herein as a bottom member) 12 and a side wall 48 with the sidewall 48 defining an interior sidewall surface 42 integrally connected to a peripheral joint 16 of the bottom 12 and extending from the peripheral joint 16 of the bottom member 12 to the top edge or rim 18 which is a length defining the height of the cooking vessel 10 extending in a vertical direction 13.

A handle 20 is attached to the top edge 18 of the side walls 14. The handle 20 may be fabricated from a metal or any suitable material as customary in the art. The handle 20 also may be made of a rubber material, or the rubber material 22 may be deposited on (or attached to) the handle 20 (as shown in FIGS. 2A-2D, 3-4, and 5E) to provide convenience and safety for a user of the boiling vessel 10.

The bottom section 12 of the cooking vessel 10 is formed with an underside connector plate 24 which extends in a horizontal direction throughout the bottom section 12 of the internal area of the boiling container 10.

Referring to the schematic FIG. 2B, it is seen that the bottom section of boiling container 10 is formed of an underside connector plate 24 which in effect divides the liquid contained in boiling container into two zones namely zone B defining an area of higher temperature than zone A during the heating phase of the heat being transported by the external heat source shown in FIG. 1 to be described in more detail in the following paragraphs with the demarcation between zones A and B being depicted by the virtual line 112 of FIGS. 1 and 2B.

Bottom section 12 in one embodiment may include underside connector plate upper member 100 and underside connector plate lower member 102 formed in one piece fabrication defining bottom section 12 of boiling container 10. As is seen in FIGS. 1 and 2B, underside connector plate upper member 100 is displaced from underside connector member lower member 102 with both extending in horizontal direction 11. Underside connecting plate upper member 100 extends throughout the horizontal length of bottom section 12. Underside connector member lower member 102 extends through a portion of the length of bottom section 12 and includes an underside connector member first section 104 and an underside connector member second section 106 formed in one-piece formation each to the other and to underside connector plate upper member 100. A gap 36 is formed between underside connector plate upper member 100 and underside connector member first section 10. Thus, underside connector plate upper member 100 and underside connector plate lower member 102 form a horizontally directed gap 36 therebetween which define zone A and zone B within boiling container 10 during the heating transport process effected by the heating source 44.

Figure 2A:
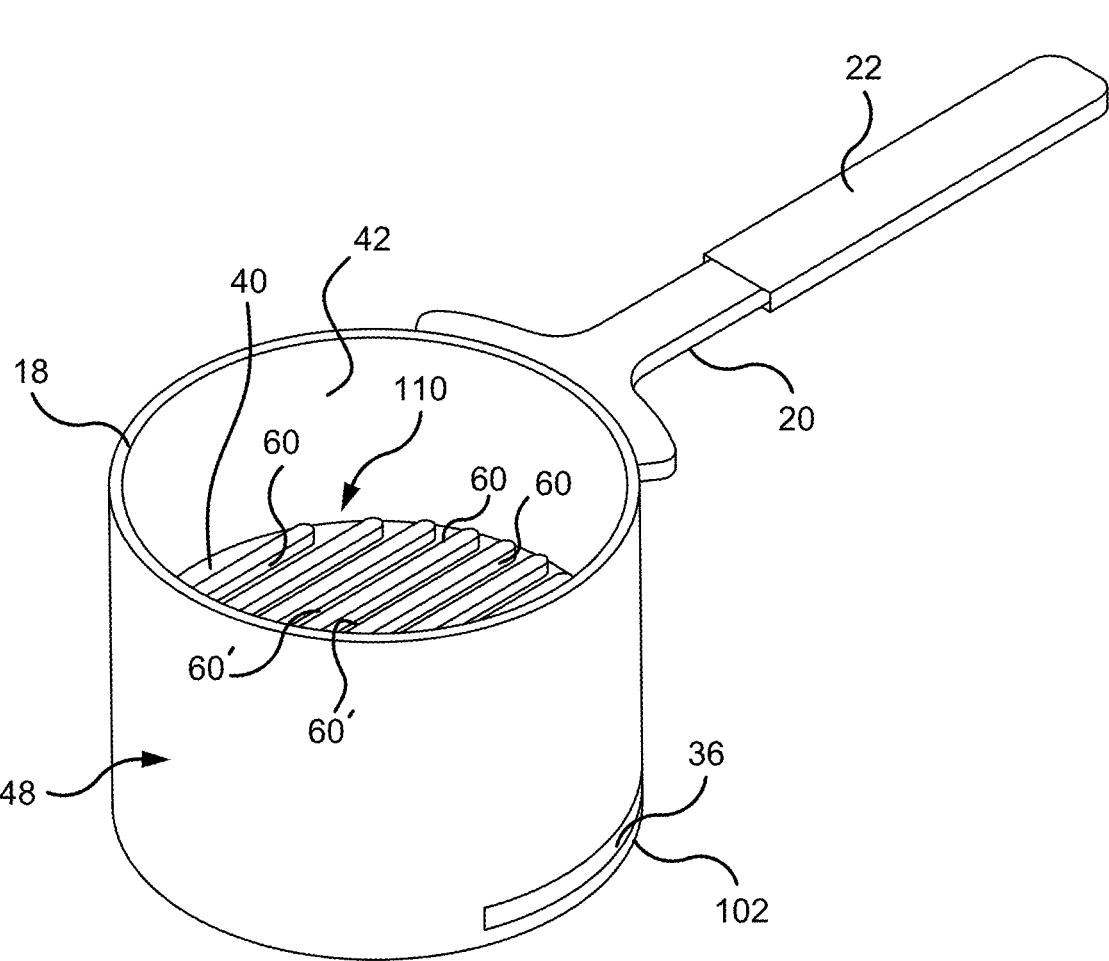
FIG. 2A is a schematic perspective view of the boiling container.
Figure 2B:
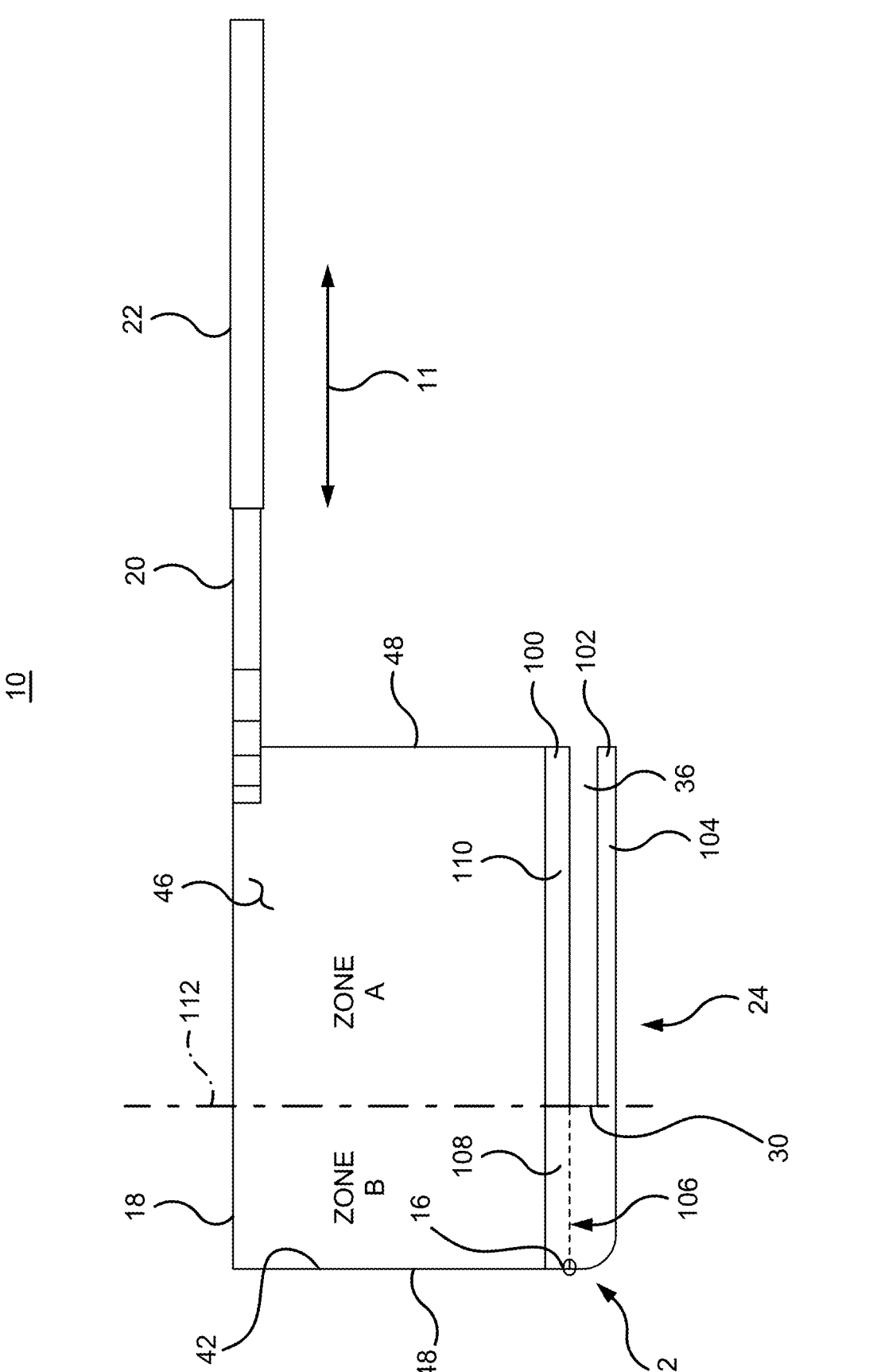
FIG. 2B is a schematic elevational side view of the present boiling container.

In this embodiment of the boiling container 10, underside connector plate 24 consists of underside connector plate member first section 104, underside connector plate member second section 106 and third underside connector plate third section 108 joined together in one piece formation as depicted in FIGS. 1 and 2B.

In an alternate embodiment of the boiling container 10, underside connector plate 24 may be formed as a component to be releasably secured to a bottom of the boiling container 10 wherein the container bottom section 12 includes bottom member 110 joined in one piece formation to boiling container sidewall 48 to form boiling container 10. In this case underside connector plate 24 includes under underside connector plate first section 104, and underside connector plate second section 106 formed in one piece formation which is releasably attached to bottom member 110. Attachment of underside connector plate 24 may be releasably secured through a number of standardly acceptable manners for example by tongue in groove components, a releasable joint member 16 as schematically shown in FIG. 2B, a releasably threaded attachment connecting bottom member 110 to the underside connector plate 24 or some substantially equivalent releasable securement mechanism, not important to the inventive concept of creating a convection flow of contained liquid between zone A and zone B within the boiling container during heat transport.

Once again referring to FIGS. 1 and 2B, gap or slot 36 is formed between bottom member 110 and underside connector member first section 104 to an extent defining the zone A and a zone B where the temperature in zone A is at a lower temperature than the temperature in zone B during the heating process.

Bottom member 110, and underside connector plate member 24 are generally formed of a highly conductive metal composition such as copper, aluminum, stainless steel or some like metal composition which have relatively high thermal conductivity parameters. Gap or slot 36 which is generally an air gap has a low thermal conductivity and serves as a thermal insulator for the portion of the bottom member having the slot or gap 36 under the bottom member 110. The gap or slot 36 is equivalent to a heat insulation layer which may be an air gap or a low conductivity composition material which may be a high temperature fiberglass or some like material resulting in the temperature difference between zones A and B within the boiling container 10. The temperature gradient between zones A and B create a circular vortex of the liquid medium as depicted by the convectional directional flow arrows 52 shown in FIG. 1. Liquid medium 46 is transported from zone A to zone B as a circular vortex created.

In an alternate embodiment, an insulating composition may be inserted within the space created by the slot gap or slot 36 which may be an insulation material composition which is adapted to be an insulation material which is capable of withstanding the high temperatures developed during the heating process.

Figures 6A, 6B, 6C, 6D, 6E, 6F:
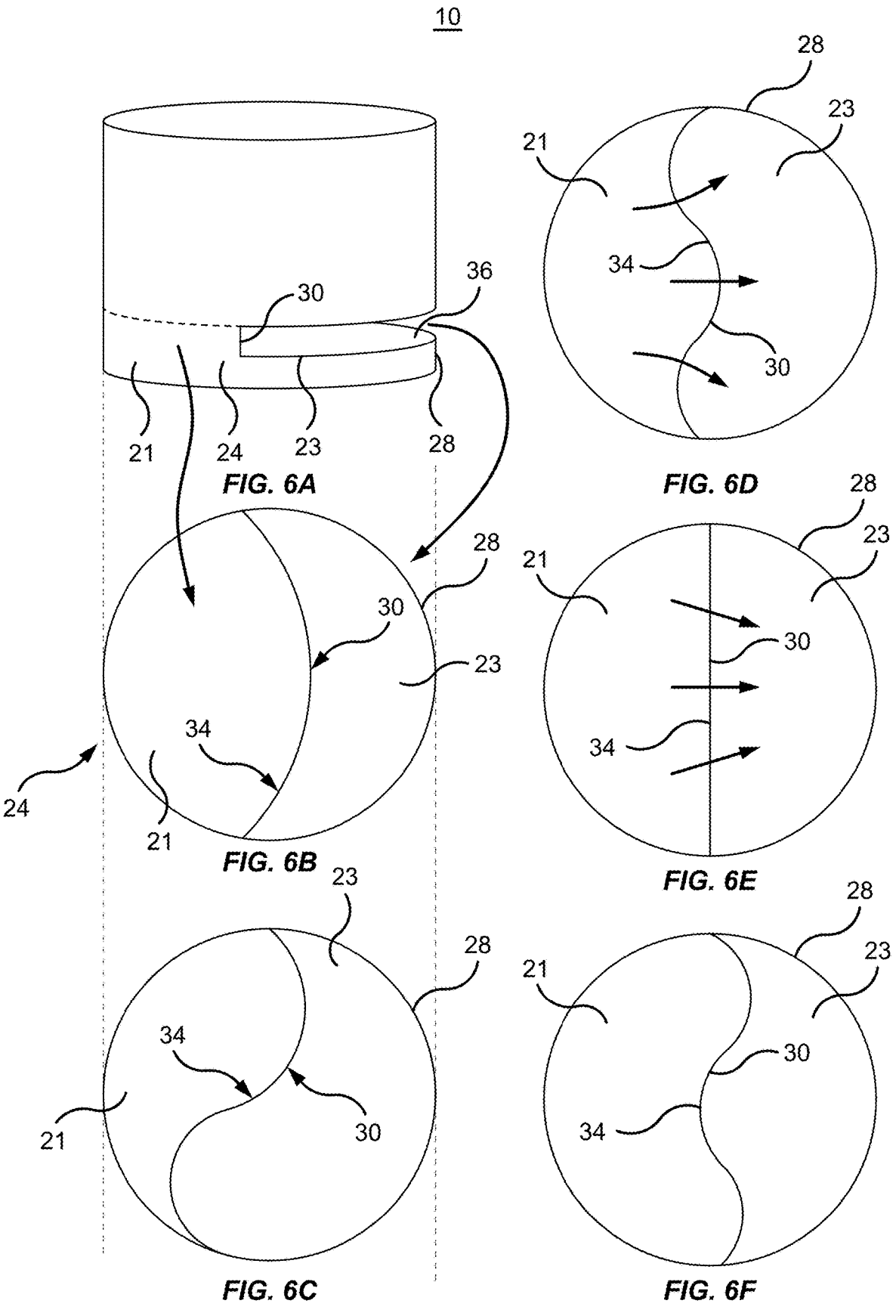
FIG. 6A-6F show differing configurations defining the first lower temperature zone and the second higher temperature zone defined by the contour of the underside connector plate.

As depicted in FIG. 6A underside connector plate is formed of a first portion 21 and a second portion 23 of underside connector plate 24. The demarcation between the first and second portions of the underside connector plate 24 is defined by the gap or slot 36 extension in the horizontal direction 11 defining the underside connector plate edge 30.

In order to obtain differing geometrical contours for the vortex of the convectional fluid flow of the liquid medium 46 within the confines of the boiling container 10, differing contours of the underside plate edge 30 may be of use due to the specific contour of the boiling container 10 which is generally circular, rectangular, oval, oblong or some other geometrical contour when taken with respect to a top view cross-section of the boiling container 10. Different contours of the underside connector plate edge 30 are provided in FIGS. 6B-6F.

In FIG. 6E, the underside connector plate edge 30 is linearly directed throughout the diameter of the boiling container 10 sidewall 48 and results in a demarcation line 34 between the underside connector plate first portion 21 and the underside connector plate second portion 23. In this contour, the demarcation line 34 is coincident with and linearly directed across the diameter of underside peripheral edge 28 of the underside connector plate 24.

FIG. 6B depicts a continuous arc shaped underside connector plate edge 30 defining the boundary 34 between the underside connector plate portion 21 and the underside connector second portion 23.

FIG. 6C depicts a continuous sine shaped underside connector plate edge 30 and coincident demarcation line 34 between underside connector plate first and second portions 21 and 23.

FIGS. 6D and 6F depict other undulating contours for underside connector plate edge 30 and demarcation line 34 which are in vertical alignment with zones B and A.

In overall concept as depicted in FIGS. 6A-6F, the first portion of underside connector plate 21 or first area 21 and the second portion of the underside connector plate 23 or second area 23 of the underside connector plate 24 may be contoured in various shapes so that the gap 36 between the second area 23 of the underside connector plate 24 and the second portion 27 of the external surface 26 of the bottom 12 are shaped accordingly in various contours, including, but not limited to the crescent contour, semi-circle, moon-shaped contour, or any other contours outlined with convex-concave and arcuated lines.

Thus, the contour of the second area 23 of the underside connector plate 24 is defined between the underside connector plate edge inner edge 30 and an outer underside connector plate edge 28. The contour of the first area 21 of the underside connector plate 24 is defined by the arcuated inner edge 34 shown in FIGS. 6B-6C 6D and 6F. The demarcation or border line 34 coincides with the arcuated inner edge 30 or the second area 23 of the underside connector plate 24.

By pre-selecting a contour or shape of the demarcation line 34 the size and configuration of the of the second area 23 of the underside connector plate 24 as well as the contour height dimension of the gap 36 the thermal gradient created in the subject the thermal gradient between zones A and B within the boiling container 10 can be modified. Thus, the efficiency of insulation can be controlled to create an improved convectional flow of the liquid medium 46 within the boiling container 10 resulting in the fluid flow convection vortex within the boiling container or cooking vessel 10 as defined by the convection flow arrows 52 shown in FIG. 1 for aiding in the prevention of spillage of liquid from the vessel during a heating process.

The benefits of separation of the volume within the boiling container 10 into the zones A and B having a thermal gradient therebetween defining a hotter zone B and a cooler zone A to create a fluid flow vortex are further enhanced in the subject boiling container 10 by creating grooves 60 within the internal surface 40 of the bottom member 12.

Figure 2C:
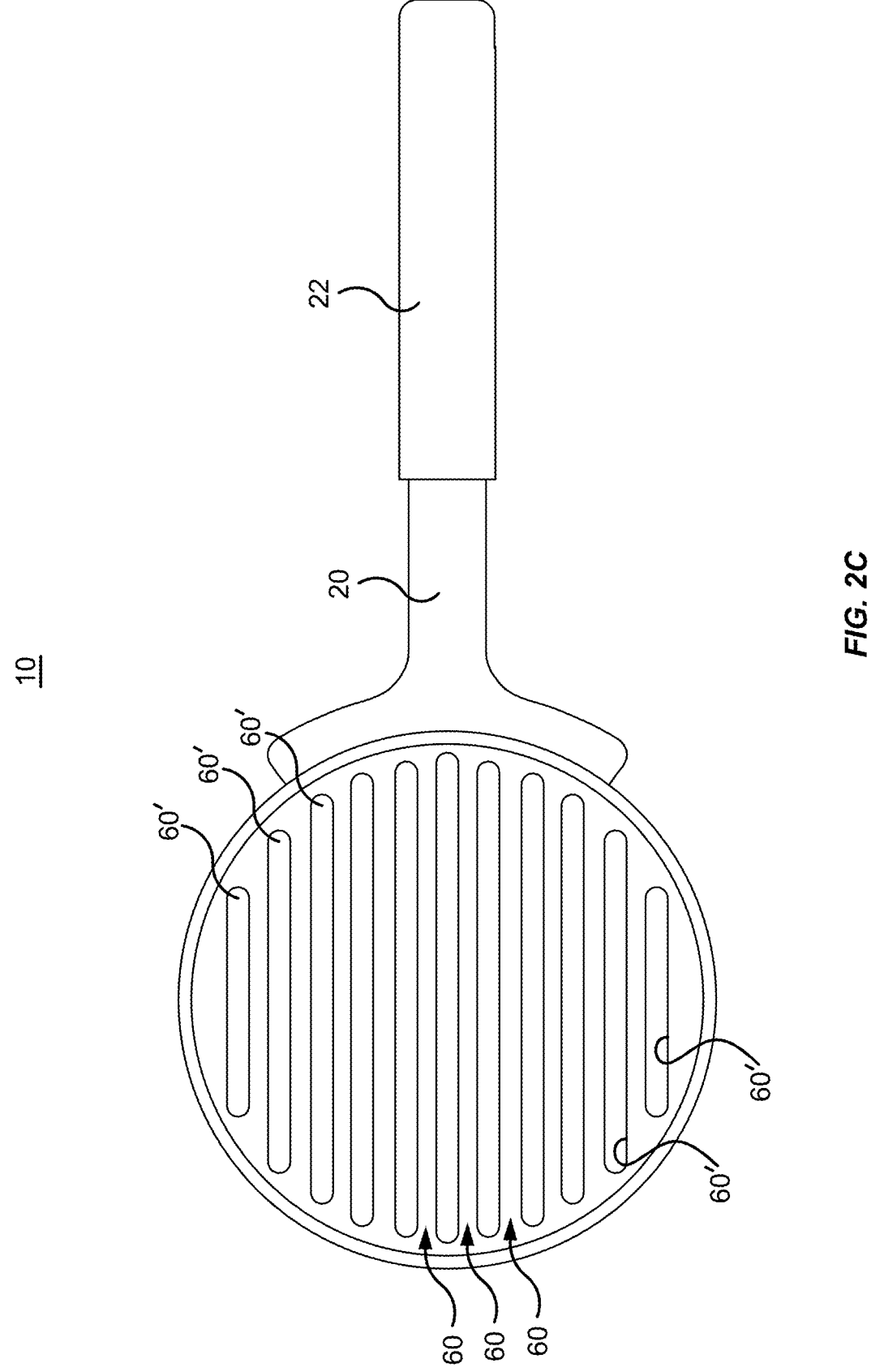
FIG. 2C is a schematic top view of the subject boiling container showing grooves for directional formation of convection flow of liquid being heated.
Figure 2D:
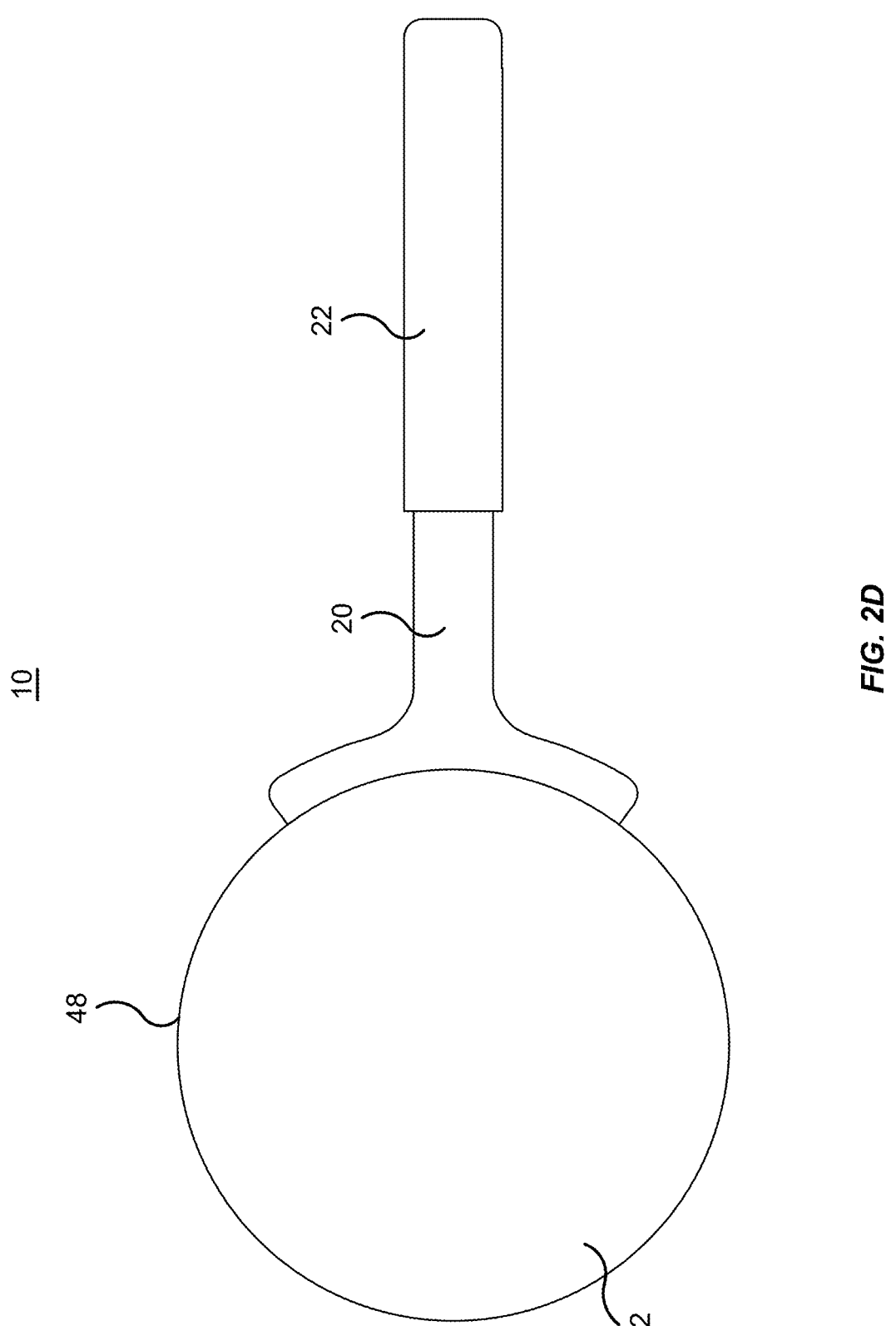
FIG. 2D is a schematic bottom view of the subject boiling container.
Figure 3:
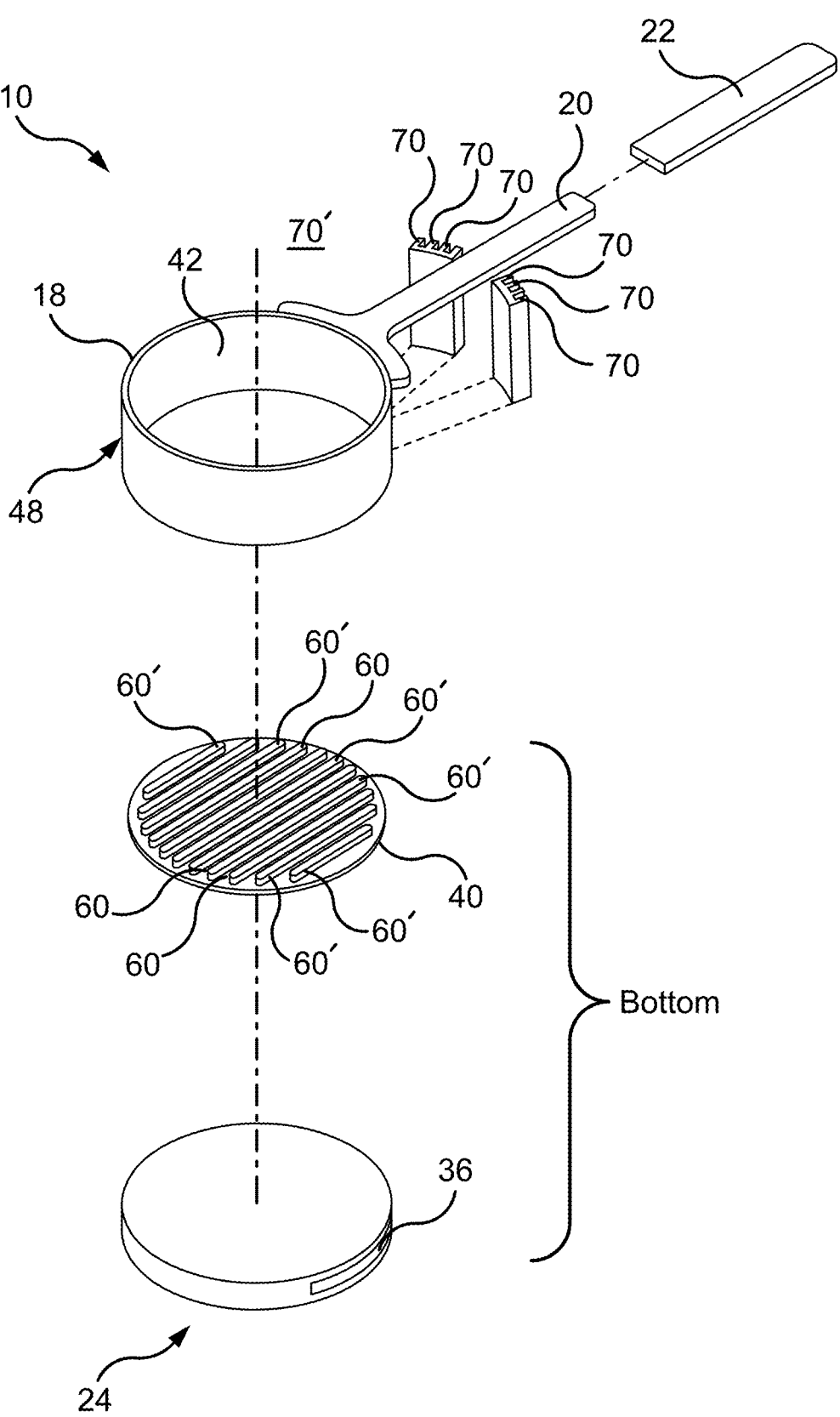
FIG. 3 is a schematic representation exploded view of the present boiling container showing the container sidewall, a bottom member of the container and a connection plate.
Figure 5A:
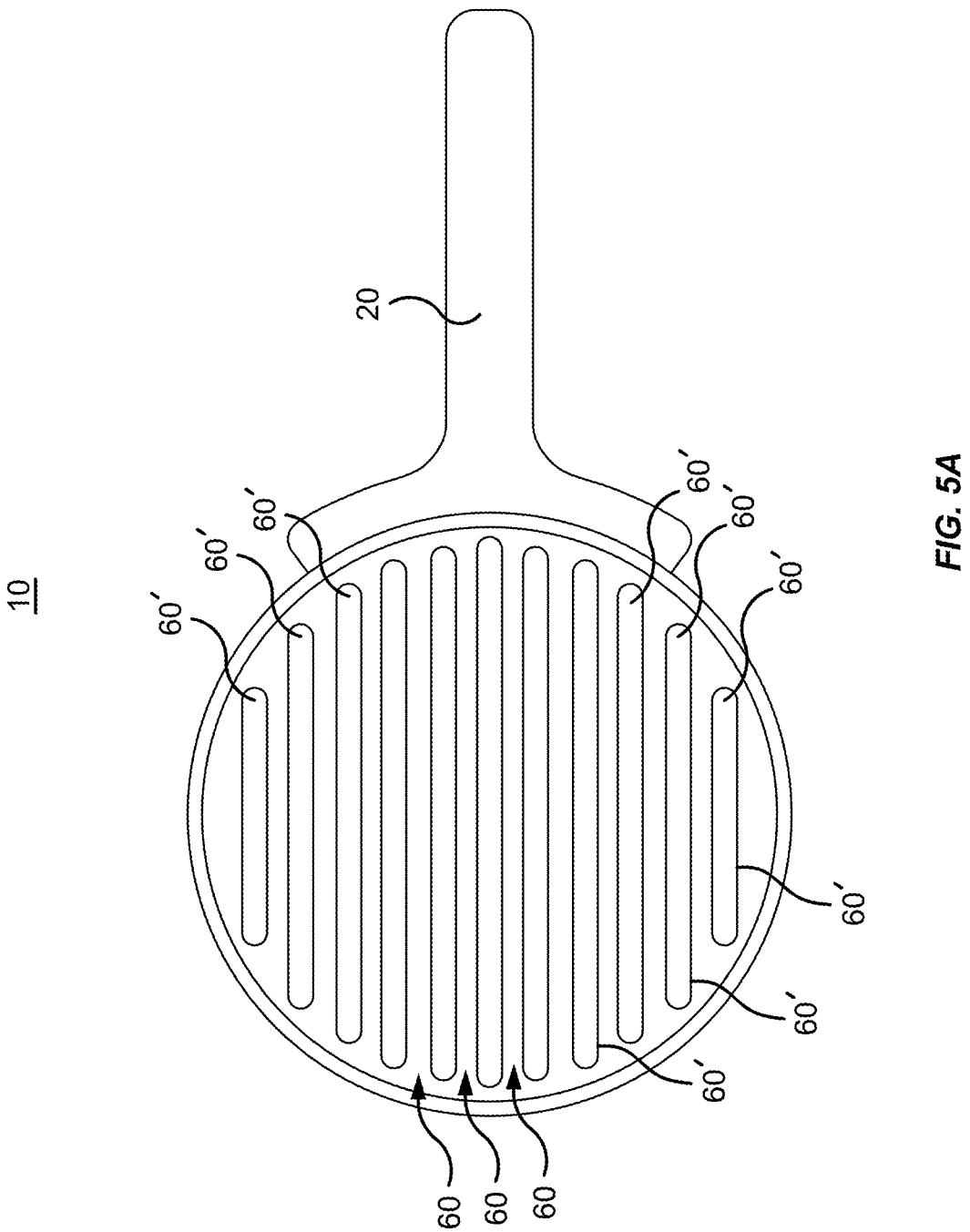
FIG. 5A is a schematic top view of the present cooking vessel having a grooved internal surface.
Figure 5B:
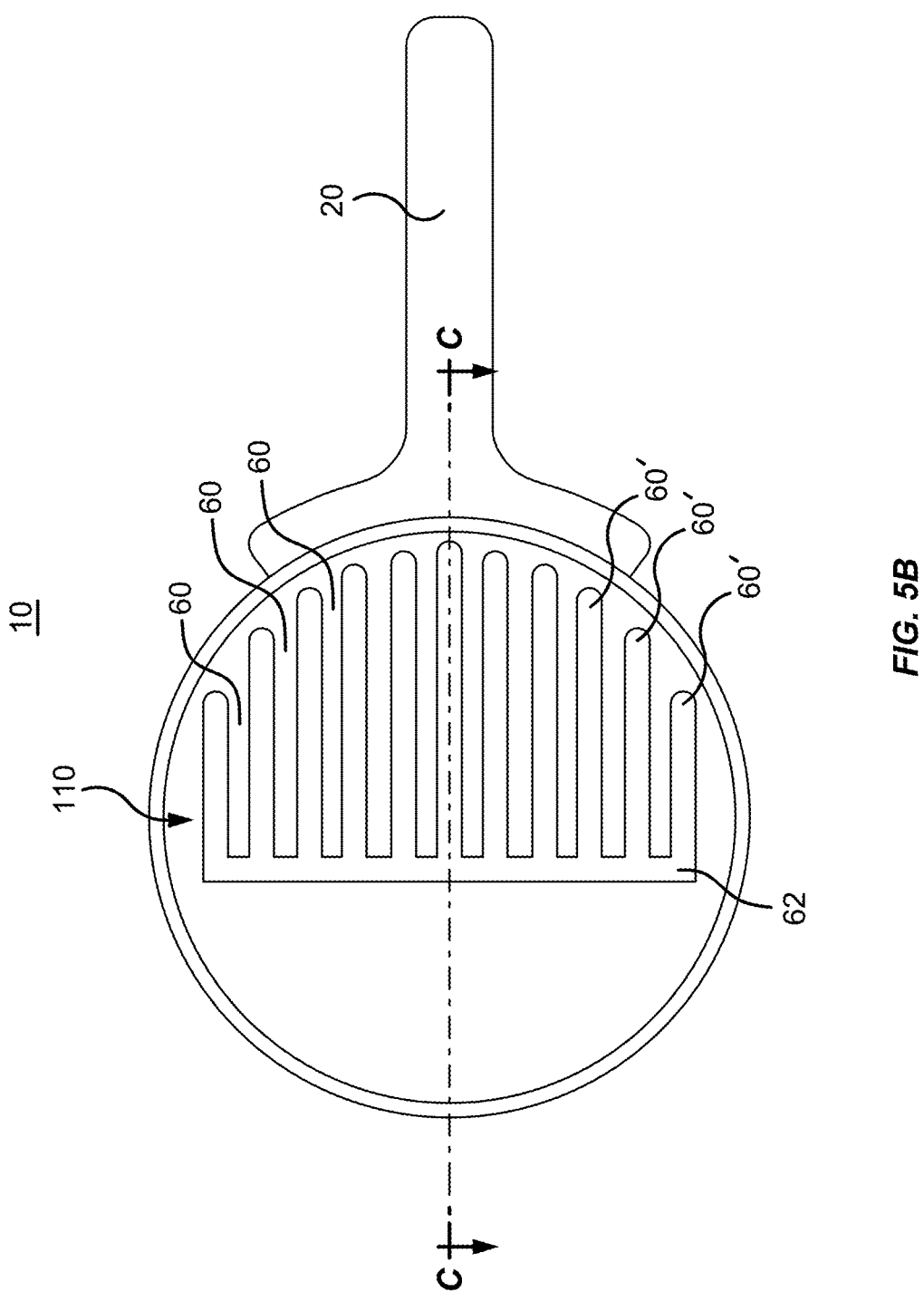
FIG. 5B shows schematically a top view of the subject boiling container having a grooved internal surface extending horizontally within a portion of the grooved internal surface.
Figure 5D:
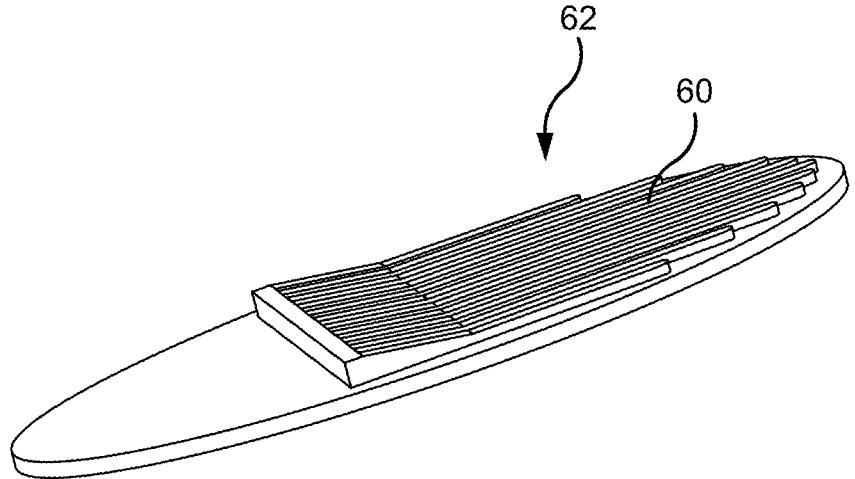
FIG. 5D is a perspective view of the bottom of the subject cooking vessel with the grooves formed on the internal surface of the bottom showing a raised portion and a jump board.

As depicted in FIGS. 2A, 2C, 3, 5A-5E, and 7A-7B, and 7D, the grooves 60 extend substantially in parallel each to the other within the internal surface 40 of the bottom member 12. The grooves 60 may either span uninterrupted along the entire diameter of the bottom member 12 (as shown in FIGS. 2C, 3, 5A), or may span over the cool portion 54 corresponding to zone A of the internal surface 40 (as shown in FIGS. 5B, 5D) with the grooves 60 terminating in the jump board 62.

The grooves 60 may be formed within the surface 110 or alternatively formed by groove bar members 60' as depicted in FIGS. 2A and 2C.

Figure 5E:
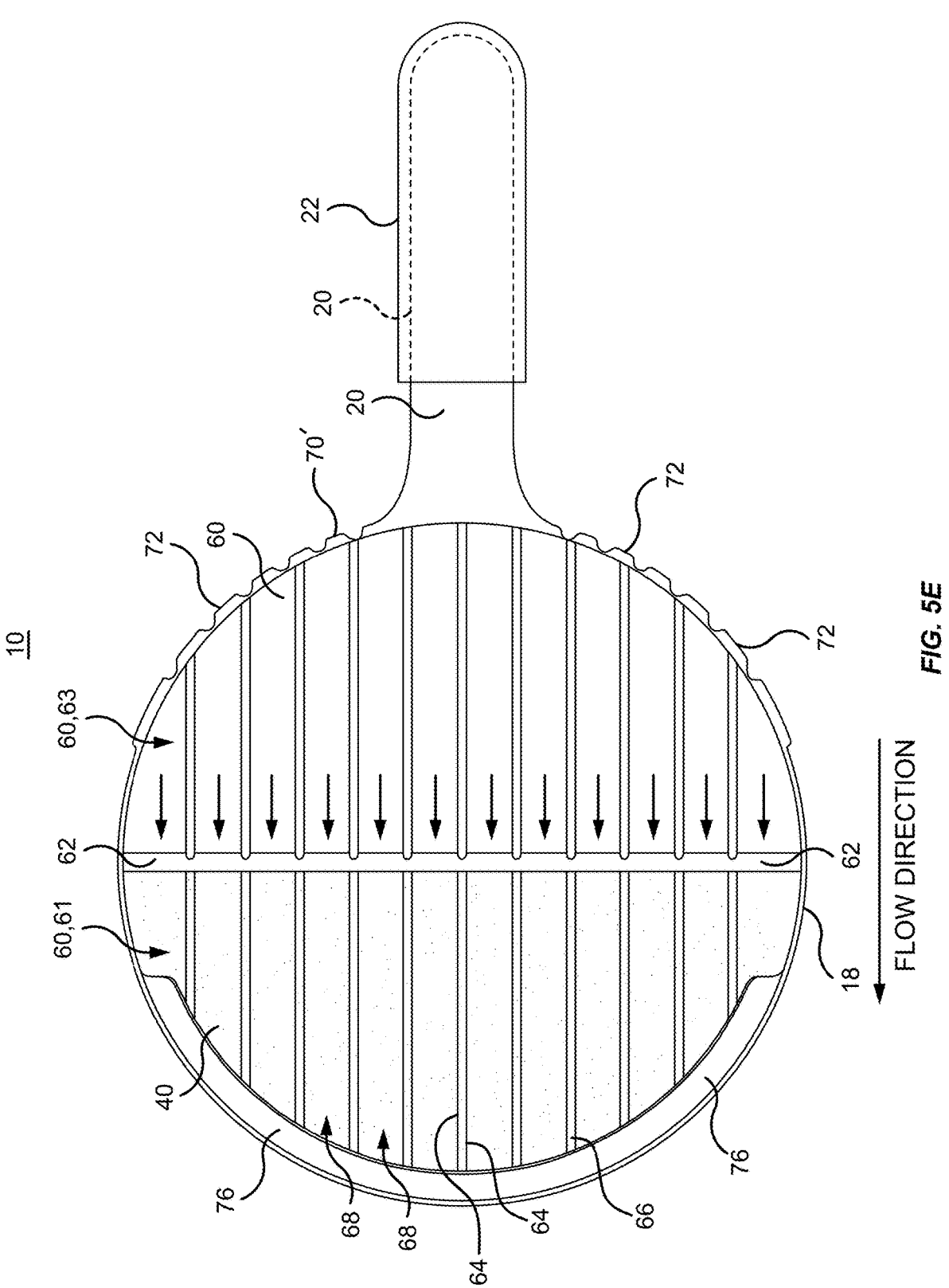
FIG. 5E is a top view of the subject boiling container showing arrays of grooves extending throughout the bottom member of the boiling container.
Figure 7A:
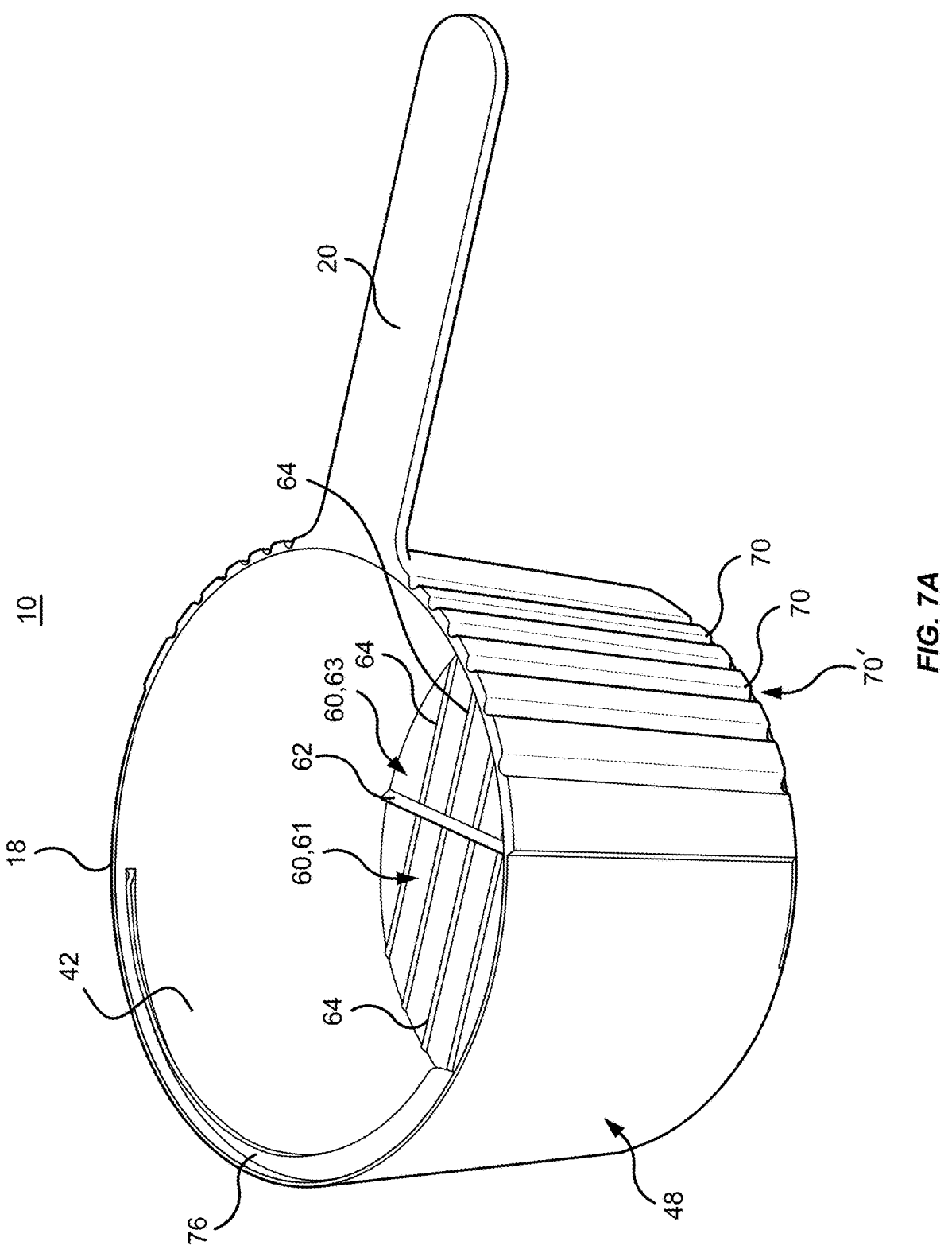
FIG. 7A is a perspective view of the subject boiling container showing the arcuate edge member on the hot side and heat radiating members formed on the cool side of the boiling container.
Figure 7B:
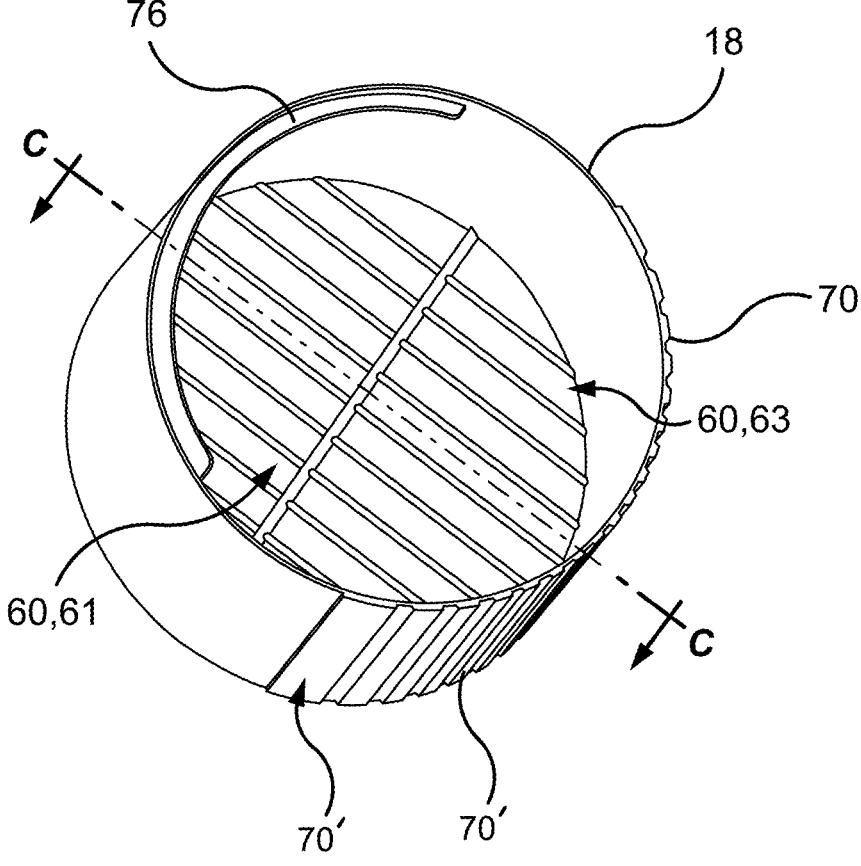
FIG. 7B is a top perspective view of a portion of the boiling container shown in FIG. 7A.

Alternately as seen in FIG. 5E there are two arrays, i.e., an array 60,61 of grooves 60 extending over the hot portion associated with zone B and an array 60,63 of grooves 63 extending over the cool portion associated with zone A, where the grooves 60 which extend in alignment with the cool portion 54 terminate with the jump board 62 with the arrays 61 and 63 extending on the internal surface 40 on both sides of the jump board 62 (as shown in FIGS. 5E, and 7A-7B).

The jump board 62 is disposed in an inclined relationship to the internal surface 40 of the bottom member 12 to give the liquid medium 46 within the cooking vessel 10 a lift (as schematically shown in FIG. 5C) to further facilitate convection and to direct the boiling liquid 46 towards the bottom 12.

The grooves on either side of the jump board 62, both on the hot portion 56 (zone B) and the cool portion 54 (zone A) of the internal surface 40 of the bottom member 12 augment the cooking vessel's surface area. The increased surface area permits the liquid medium 46 within the boiling container 10 to heat more rapidly, thus making the cooking process more efficient and convenient.

The grooves 60 have side walls 64 and a top wall 66 extending above the inner surface 40 of the bottom member 12 by a predetermined height of the grooves 60 so that inter-groove channels 68 are formed between the side walls 64 of the grooves 60. The efficiency of the boiling process within the boiling container 10 is highly improved by fabricating the internal surface 40 of the bottom member 12 with the grooves 60 raised above the internal surface 40 since the channels 68 between the grooves 60 provide an enhanced directional flow for the liquid 46 from the cooler side zone A to the hotter zone B of the boiling container 10. The liquid flow directionality from the cooler area to the hotter area further facilitates improved boiling process with the simultaneous laminar behavior of the flow of the liquid within the channels 68.

Figure 4:
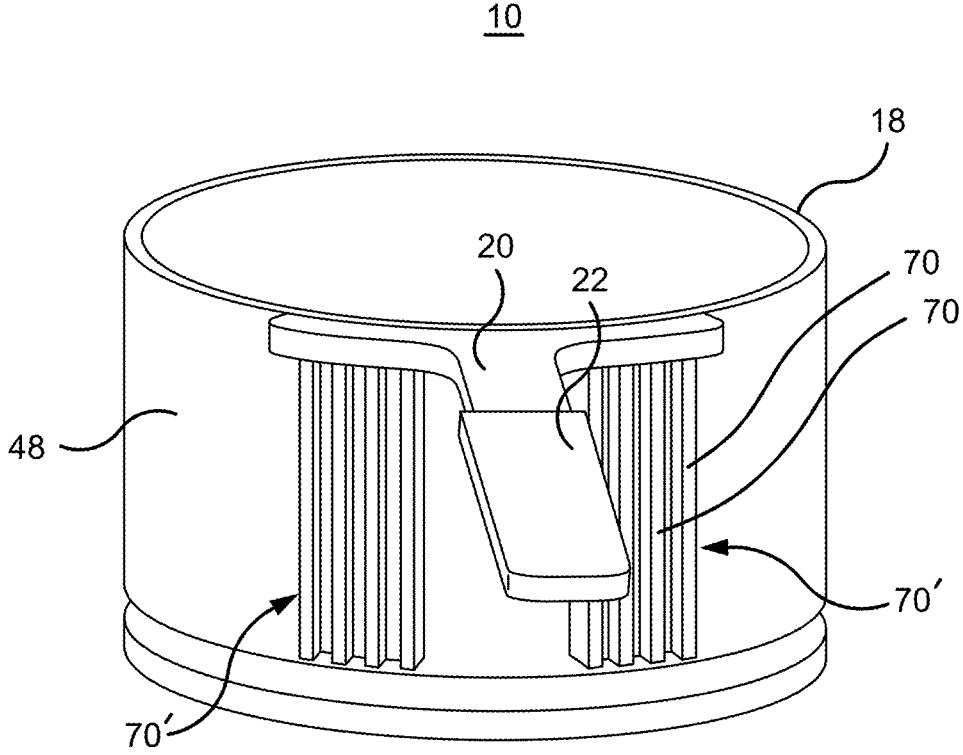
FIG. 4 is a schematic view of the boiling container in perspective showing heat radiating members formed on a sidewall of the boiling container.

Referring now to FIGS. 3 and 4 there is shown boiling container 10 in a partial exploded format. The boiling container or cooking vessel 10 is further provided with one or more radiant members 70 with one or more heat radiant members 70 which are either fixedly adhered to boiling container 10 sidewall 48 adjacent to zone A depicting the cooler volume of the liquid medium 46 during a heating process.

As depicted in FIGS. 3 and 4 a radiant heat assembly 70' containing one or more heat radiant members 70 is/are mounted on/or formed in one-piece formation with boiler container 10 which serves to dissipate heat from the side wall 48 of the container 10 adjacent the boiler handle 20.

The one or more heat radiant members 70 includes a plurality of fins 72 which may be integrally formed on the side wall 48 adjacent at the cooler side 48 (adjacent zone A) of the cooking vessel 10 in proximity to the connection of the handle 20 to the side wall 14 adjacent zone A. Alternatively, the heat radiant members 70 may be fabricated separately and subsequently attached (adhered) to the outer surface of the side walls 14 also in proximity to the handle 20 to dissipate heat from the side of the vessel 10 which is adjacent to the handle 20 to provide safety and convenience to a user of the cooking vessel 10.

The handle 20 may be formed of a metal material. A low conductivity composition member 22 serves as an insulation barrier and may be formed of a rubber composition or some like composition to impede the heat transport from the handle 20 during the heating process. The insulation barrier or other low conductivity composition member 22 shown in FIGS. 2A-2D, 3 and 4, may be either applied as an additional layer of the rubber insulation material onto the portion of the metal handle 20, or the handle 20 can be inserted into the prefabricated rubber insulation sheath 22, dependent on the manufacturing specifics of the fabrication process of the cooking vessel 10.

Referring now to FIGS. 7A-7D, a further improvement to the subject cooking vessel 10 includes fabrication of the top of the side wall 14 with an inward edge member 76 on the hot side 50 of the cooking vessel 10. In this embodiment, the sidewall upper edge 18 is contoured inwardly with respect to zone B for inwardly directing the rising liquid during the heating process internally into the cooking vessel 10 to aid with the vortex flow within the boiling container 10 and to provide an additional protection from spillage of the liquid external to the boiling container 10 during the heating process.

The inner edge member 76 is generally formed in an inwardly facing arcuately shaped contour for directing the flow of any impinging liquid or vapor back into the confines of the boiling container 10. The inner edge member 76 may be formed in one piece formation with the boiling container sidewall 48 or be a releasable attachment which can be releasably attached to the sidewall upper edge 18. Where the inner edge member is releasably attached to the sidewall upper edge 18 such can be accommodated with a snap-on contour or some like releasable attachment.

The inner edge member 76 may extend circumferentially around the entire periphery of the sidewall upper edge 18 or throughout a portion thereof coincident with the periphery of boiling container sidewall 48 within the heated zone B. The inner edge member 76 may be formed of a metal or plastic composition not important to the inventive concept with the exception that the composition of the inner edge member 76 is a composition which can withstand the heated temperature of the heated liquid medium 46 during the heating process without deformation.

Figure 7C:
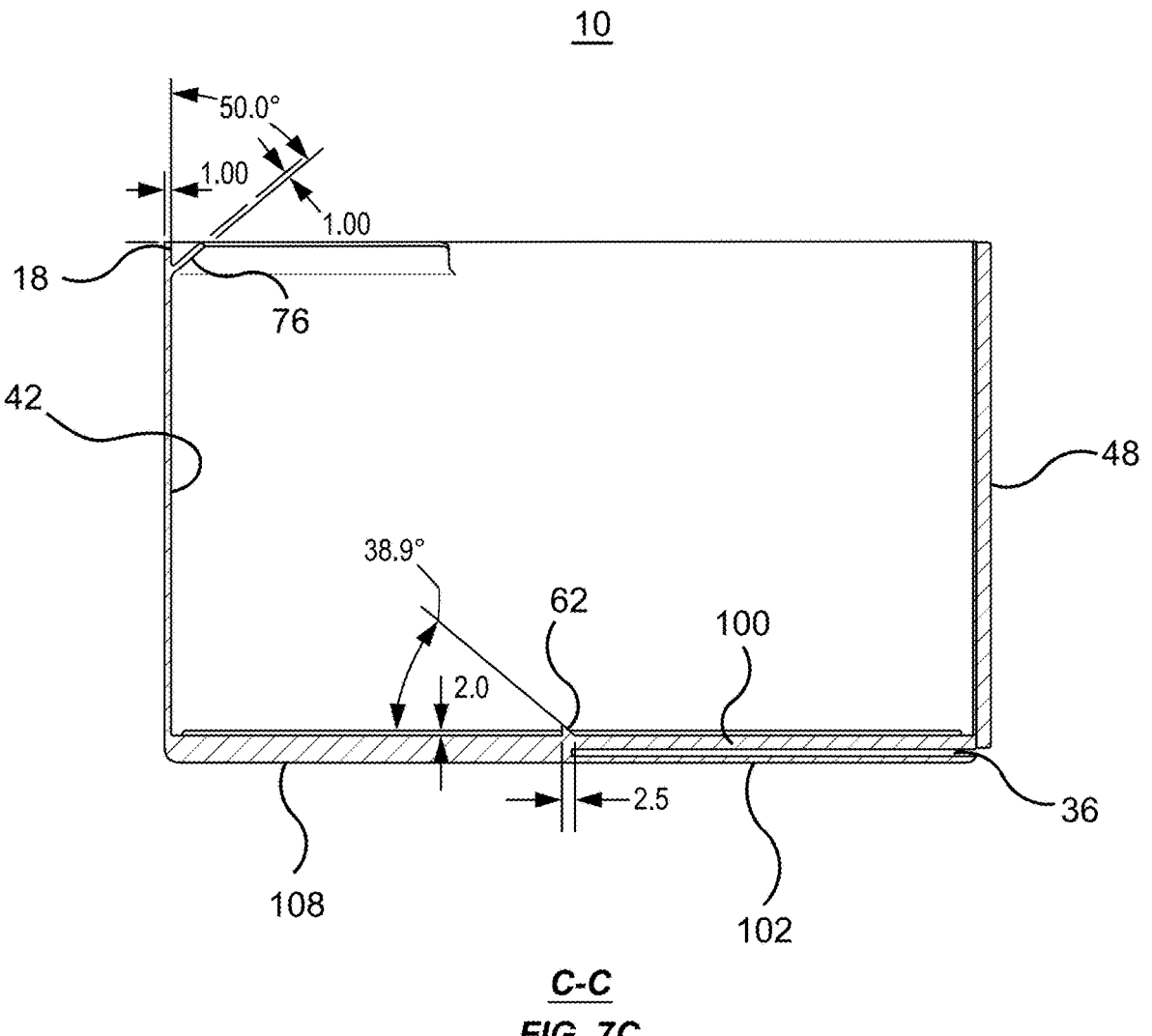
FIG. 7C is a cross-section taken along lines C-C of FIG. 7B.
Figure 7D:
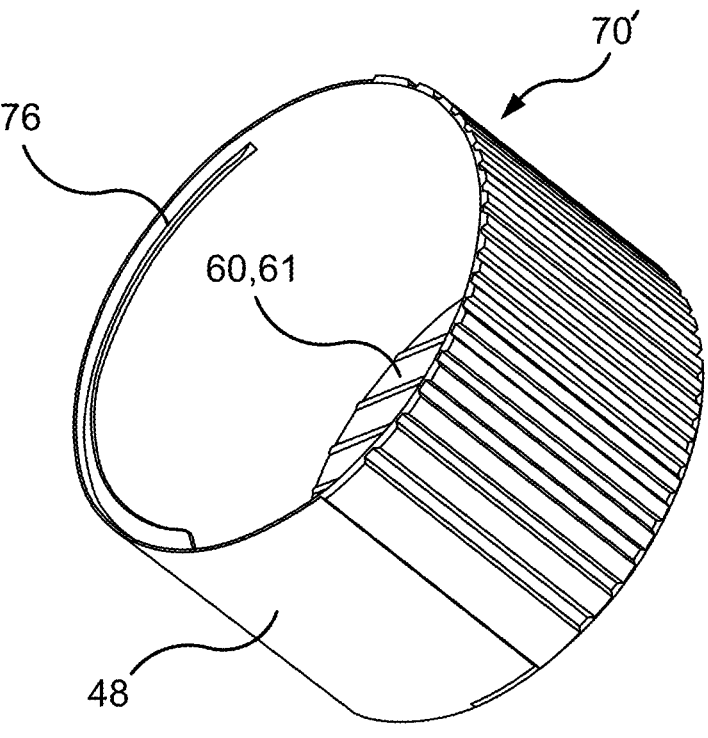
FIG. 7D is a side perspective view of the boiling container sidewall showing the heat radiant configuration for dissipating the heat from the side of the vessel adjacent to the handle.

A test was performed to confirm the efficiency of the subject boiling container 10 in prevention of the spillage of the liquid during a heating process in accordance with the dimensions shown in FIG. 7C. The test was performed using a standard aluminum vessel having an internal diameter of 8.5 inches and a depth of 4.5 inches. The metal container was filled approximately half full with water having a temperature of approximately 25 degrees C. Heat was applied by a gas heating source 44 until the temperature approximated 100 degrees C. when boiling was initiated.

Test set-up included an external surface 26 for directing fluid flow in a direction approximating 38.9 degrees from the horizontal as fluid flowed from zone A to zone B into a vortex defined by the directional arrows 52 shown in FIG. 1. An edge member 76 having an angle of 50 degrees from the vertical directed the heated liquid and vapor back into the metal container 10.

A mathematical formula was applied to numerically solve the Navier-Stokes equations for the two-phase fluid flow (water and air) using a volume of fluid (VOF) method in order to solve the dimensional aspects of the fluid flow. A software program "Ansys Fluent" was used which is a fluid simulation computer program for modelling and accuracy in computational fluid dynamics (CFD). The result was obtained indicating the evolution of the fluid flow that was produced based on the thus obtained solution of the Navier-Stokes equations.

During the heating process no spillage of liquid was observed confirming the efficacy of the prevention spilling system.

Another embodiment of the subject Patent Application concept is directed to creating a fluid vortex in a container which develops the flow current through the use of material compositions. Container or vessel or pot 10 is provided containing liquid 46 which is being heated by a heating system 44 such as that shown in FIG. 1. The container 10 has a side wall 46 and a base member or base section 12, however, however in this embodiment the base section is formed of two generally metallic materials having different thermal conductivities creating a Zone "A" and a Zone "B" as depicted FIG. 1. Where Zone "B" contains the liquid being heated having a high heat transport capability and is at a higher temperature than Zone "A".

In this embodiment, the base member is formed in one-piece formation of two (or more) solid metal compositions having differing thermal conductivities being devoid of an insulation layer associated with the portion of the base section below the Zone "A" shown in FIG. 1. As an, as seen in FIGS. 6a-6f, the base section 12 is divided into separate areas of heating represented by the area 23 formed of a metal composition having a lower thermal conductivity than the area 21. Boundary line 30 represents the line where base area 23 is the boundary where base area represents the surface of a first metallic composition having a low thermal conductivity and base area 21 represents a base section area having a second metallic composition of higher thermal conductivity than the metallic composition associated with base section 23.

Base member or section 12 is thus formed in one piece formation as a solid metal member devoid of thermal insulation layers dividing the Zones "A" and "B" into higher and lower temperature zones "A" and "B", whether they be of low thermal conductivity material in certain areas or using air in one of the zones as an insulator. The concept of this embodiment is to use two slabs of metallic composition members having differing thermal conductivities to create the flow vortex represented by the directional arrows depicted in FIG. 1. For example base section 21 may be formed of copper having a thermal conductivity within the range 365-423 $w\text{-}m^{-1}\text{-}K^{-1}$ in contact with container liquid in Zone B for high heat transport whereas Zone A (associated with the base area 23) is formed of a lower thermal conductivity material such as possibly stainless steel having a thermal conductivity in the range or 16-24 $w\text{-}M^{-1}\text{-}K^{-1}$ (associated with the base area 21) or even aluminum having a thermal conductivity in the range of 70-100 $w\text{-}m^{-1}\text{-}K^{-1}$.

Joining the base area 21 to the base area 23 may be accomplished through welding, or some like technique dependent on the material compositions making up the base member 12.

Alternatively, a heat flow vortex can be created by placing two metal composition slabs of differing thermal conductivity within a casing such as aluminum and joined to the sidewall 48 of the heated container 10 in one piece formation.

In this manner the liquid floe 52 vortex is created during a heating process to provide for smoother, less dynamic approach to the container liquid being heated.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. An overflow prevention container containing a liquid medium being heated, comprising:

a sidewall extending in a vertical direction;

a bottom member having an internal surface contiguous the liquid medium contained within said container and an external surface, said bottom member joined to said sidewall in one piece formation at a peripheral joint area, wherein said external surface of said bottom member includes a first portion and a second portion, said bottom member being configured with an underside connector plate, wherein said underside connector plate has a first area integrally fixed to said first portion of said external surface of said bottom member and a second area positioned in vertical alignment with said second portion of said external surface of said bottom member, said second area of said underside connector plate extending in a horizontal direction in spaced apart relationship with said second portion of said external surface of said bottom member forming a horizontally directed slot or thermal isolation gap therebetween, wherein said horizontally directed slot or thermal isolation gap is formed in said underside connector plate to extend throughout only said second area of said underside connector plate for forming two distinct thermal zones of said liquid medium in said container whereby said liquid medium is convectively displaced in a circular contour within said container.

2. The overflow prevention container as recited in claim 1, wherein said sidewall has an inner surface and an outer surface, said sidewall extending vertically from said peripheral joint area of said bottom member in an integral connection therewith, wherein a vessel cavity is defined by said internal surface of said bottom member and said inner surface of said sidewall.

3. The overflow prevention container of claim 2, further comprising an array of grooves fabricated on said internal surface of said bottom member, said array of grooves extending substantially in parallel relationship each to the other between respective portions of said peripheral joint area of said bottom member, wherein a plurality of inter-groove channels are formed between adjacent grooves of said array of grooves to provide a directional flow of said liquid medium within said vessel cavity along said plurality of inter-groove channels.

4. The overflow prevention container of claim 3, wherein each groove of said array of grooves has groove walls extending above said internal surface of said bottom member, and wherein each inter-groove channel of said plurality of inter-groove channels is defined between corresponding ones of said groove walls of said adjacent grooves of said array of grooves.

5. The overflow prevention container of claim 3, wherein said array of grooves includes a first array of substantially parallel grooves extending on said internal surface of the bottom member above said first portion of said external surface of said bottom member and a second array of substantially parallel grooves extending on said internal surface of said bottom member above said second portion of the external surface of said bottom member, and a jump board extending on said internal surface of said bottom member in an inclined relationship therewith across and between said first and second arrays of said substantially parallel grooves.

6. The overflow prevention container of claim 5, wherein said jump board lifts the flow of the liquid medium within said vessel cavity moving along said plurality of inter-groove channels in a direction from said second portion of said external surface of said bottom member towards said first portion of said external surface of said bottom member.

7. The overflow prevention container of claim 5, wherein said first and second arrays of grooves provide a smooth and continuous thermal transformation for the flow of the liquid medium moving along said plurality of inter-groove channels.

8. The overflow prevention container of claim 2, further comprising at least one heat radiant member disposed at the outer surface of said sidewall at a location proximal to said second portion of said external surface of said bottom member, said at least one heat radiant member includes a plurality of fins formed on and extending from a corresponding section of said outer surface of said sidewall to dissipate heat therefrom.

9. The overflow prevention container of claim 2, wherein said sidewall has an upper edge, and wherein a whole or at least a portion of said upper edge of said sidewall is curved inward of said vessel cavity to direct a flow of said liquid medium inward of said vessel cavity.

10. The overflow prevention container of claim 2, wherein said sidewall has a detachable upper edge, and wherein a whole or at least a portion of said upper edge of said sidewall is curved inward of said vessel cavity to direct a flow of said liquid medium inward of said vessel cavity.

11. The overflow prevention container of claim 2, further comprising a handle attached to said sidewall in proximity to said second portion of said external surface of said bottom member, said handle having a thermal insulating member attached thereto.

12. The overflow prevention container of claim 1, wherein upon bringing said underside connector plate in thermal contact with a heat source, a thermal gradient is generated between said first and second portions of said external surface of said bottom member thereby forming said two distinct thermal zones of said container as a first thermal zone and a second thermal zone, wherein said first thermal zone is formed in correspondence to said first portion of said external surface of said bottom member and said second thermal zone is formed in correspondence to said second portion of said external surface of said bottom member, wherein said first thermal zone of said container has a liquid medium temperature exceeding a liquid medium temperature of said second thermal zone of said container.

13. The overflow prevention container of claim 12, wherein said liquid medium received in said vessel cavity is exposed to said thermal gradient to displace said liquid medium from said second thermal zone towards said first thermal zone of said container for generating said circular convective flow displacement of the liquid medium within said vessel cavity, thereby preventing the liquid medium from overflowing the vessel cavity.

14. The overflow prevention cooking vessel of claim 1, wherein said underside connector plate and said second portion of said external surface of said bottom member define said thermal isolation gap sandwiched therebetween, said thermal isolation gap reducing heat transport to said second portion of said external surface of said bottom member by the heat source.

15. The overflow prevention container of claim 14, wherein said thermal isolation gap is devoid of any intervening material.

16. The overflow prevention container of claim 14, wherein said bottom member and said sidewall of said container are fabricated of a metal having a predetermined thermal conductivity, and a thermal insulating member is inserted within said thermal isolation gap and has a thermal conductivity lower than said predetermined thermal conductivity of said bottom member and said sidewall of said container.

17. The overflow prevention container of claim 1, wherein said second portion of said external surface of said bottom member is defined by a respective portion of said peripheral joint area and an arcuated bordering line extending between said first and second portions of said external surface of said bottom member.

18. The overflow prevention container of claim 1, wherein a contour of said second portion of said external surface of said bottom member is selected from a group including a straight, angled, semi-circle, crescent, concave-convex contours, and a combination thereof.

19. A spill-proof container, comprising:
  a bottom member having an internal surface and an external surface, and a peripheral joint area outlining said internal and external surfaces of said bottom member, wherein said external surface of said bottom member has a first portion and a second portion bordering with one another, and wherein said bottom member is configured with an underside connector plate,
  wherein said underside connector plate has a first area integrally secured to said first portion of said external surface of said bottom member and a second area positioned in vertical alignment with said second portion of said external surface of said bottom member, said second area of said underside connector plate extending horizontally in a spaced apart relationship with and in a thermal separation from said second portion of said external surface of said bottom member to define a horizontally directed slot or thermal isolation gap therebetween, wherein said horizontally directed slot or thermal isolation gap is formed in said underside connector plate to extend throughout only said second area of said underside connector plate for forming two distinct thermal zones of said liquid medium in said container whereby said liquid medium is convectively displaced in a circular contour within said container; and
  an array of grooves fabricated on said internal surface of said bottom member, said grooves extending substantially in parallel to one another between respective portions of said peripheral joint area of said bottom member with a plurality of inter-groove channels formed between adjacent grooves to provide a directional flow of the liquid medium along said inter-groove channels within a vessel cavity defined by said internal surface of said bottom member.

20. The spill-proof container of claim 19, wherein said array of grooves includes a first array of substantially parallel grooves extending on said internal surface of the bottom member above said first portion of said external surface of said bottom member and a second array of substantially parallel grooves extending on said internal surface of said bottom member above said second portion of the external surface of said bottom member, wherein a plurality of inter-groove channels is formed between adjacent said first array of substantially parallel grooves and between adjacent said second array of substantially parallel grooves, and a jump board extending on said internal surface of said bottom member in a tilted relationship therewith across and between said first and second arrays of said substantially parallel grooves, wherein said jump board lifts the flow of said liquid medium within said container moving along said plurality of inter-groove channels in a direction from said second portion towards said first portion of said external surface of said bottom member.

21. A spill-proof container, comprising:
a bottom member having an internal surface and an external surface, and a peripheral joint outlining said internal and external surfaces of said bottom member, wherein said external surface of said bottom member

18 has a first portion and a second portion bordering with one another, and wherein said bottom member is configured with an underside connector plate,
wherein said underside connector plate has a first area integrally secured to said first portion of said external surface of said bottom member and a second area positioned in vertical alignment with said second portion of said external surface of said bottom member, said second area of said underside connector plate extending horizontally in a spaced apart relationship with and in a thermal separation from said second portion of said external surface of said bottom member to define a horizontally directed slot or thermal isolation gap therebetween, wherein said horizontally directed slot or thermal isolation gap is formed in said underside connector plate to extend throughout only said second area of said underside connector plate for forming two distinct thermal zones of said liquid medium in said container whereby said liquid medium is convectively displaced in a circular contour within said container, and
wherein a contour of said second portion of said external surface of said bottom member is selected from a group including a straight, angled, semi-circle, crescent, concave-convex contours, and a combination thereof.

* * * * *